(12) United States Patent
Yamazaki et al.

(10) Patent No.: US 8,795,131 B2
(45) Date of Patent: *Aug. 5, 2014

(54) METHOD AND APPARATUS FOR REDUCING TORQUE DURING A TRANSMISSION UPSHIFT FOR A HYBRID VEHICLE

(71) Applicant: Ford Global Technologies, LLC, Dearborn, MI (US)

(72) Inventors: Mark Steven Yamazaki, Canton, MI (US); Fazal Urrahman Syed, Canton, MI (US); Daniel Scott Colvin, Farmington Hills, MI (US); Christopher Alan Lear, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

This patent is subject to a terminal disclaimer.

(21) Appl. No.: 13/687,451

(22) Filed: Nov. 28, 2012

(65) Prior Publication Data

US 2014/0148309 A1    May 29, 2014

(51) Int. Cl.
*B60K 1/02* (2006.01)
*B60L 11/00* (2006.01)
*B60W 10/06* (2006.01)

(52) U.S. Cl.
CPC .................................. *B60W 10/06* (2013.01)
USPC ............................................... 477/3; 701/22

(58) Field of Classification Search
USPC ............................................................ 477/3
See application file for complete search history.

(56) References Cited

U.S. PATENT DOCUMENTS

| 5,944,630 | A | 8/1999 | Omote |
| 5,951,614 | A | 9/1999 | Tabata et al. |
| 6,482,125 | B2 * | 11/2002 | Urasawa ........................ 477/107 |
| 6,595,895 | B2 * | 7/2003 | Suzuki et al. ...................... 477/3 |
| 6,712,735 | B2 * | 3/2004 | Hayabuchi et al. .............. 477/68 |
| 6,862,511 | B1 | 3/2005 | Phillips et al. |
| 7,024,298 | B2 * | 4/2006 | Oohori et al. ................... 701/54 |
| 7,261,670 | B2 * | 8/2007 | Endo et al. ......................... 477/3 |
| 7,261,671 | B2 * | 8/2007 | Ortmann et al. .................. 477/6 |
| 7,331,899 | B2 * | 2/2008 | Ortmann et al. .................. 477/6 |
| 7,798,938 | B2 * | 9/2010 | Matsubara et al. ................ 477/3 |
| 7,954,581 | B2 * | 6/2011 | Tanishima ............... 180/65.275 |
| 8,061,462 | B2 * | 11/2011 | Soliman et al. .......... 180/65.265 |
| 8,224,513 | B2 * | 7/2012 | Soliman et al. .................. 701/22 |
| 8,241,174 | B2 * | 8/2012 | Wallner et al. ..................... 477/5 |
| 8,649,924 | B2 * | 2/2014 | Imaseki ........................... 701/22 |
| 2012/0129649 | A1 * | 5/2012 | Kaltenbach ....................... 477/5 |

* cited by examiner

*Primary Examiner* — Dirk Wright
(74) *Attorney, Agent, or Firm* — David B. Kelley; Brooks Kushman P.C.

(57) ABSTRACT

A hybrid vehicle powertrain that has an engine and an electric machine that may separately or jointly provide torque to a multi-speed transmission. A drivetrain including the engine and the motor is controlled to reduce the requested level of torque provided to the transmission during an upshift. The method is initiated by a request for a reduction of the level of torque and checking the operating state of the engine. If the engine is not on, the torque from the motor is reduced. If the engine is on, the torque from the motor is reduced first and then the torque from the engine is reduced to the requested level of torque.

18 Claims, 4 Drawing Sheets

METHOD AND APPARATUS FOR REDUCING TORQUE DURING A TRANSMISSION UPSHIFT FOR A HYBRID VEHICLE

TECHNICAL FIELD

This disclosure relates to controls for a hybrid vehicle powertrain that has an engine and an electric machine, or motor/generator, that may separately or jointly provide torque to a multi-speed transmission.

BACKGROUND

Hybrid vehicles may have many different powertrain configurations. In one configuration, two torque producers may provide torque to the transmission. An electric machine may be used to provide torque and charge a battery and a combustion engine may also be used to provide torque. The electric machine and engine may be selectively connected or separated by a disconnect clutch to provide torque to the transmission either jointly or separately.

When shifting to a higher gear, the torque provided to the step ratio transmission is normally reduced to counter inertia torque. This event is referred to as torque reduction during transmission upshift, or upshift torque reduction. If torque is not reduced during an upshift of the transmission, a noticeable torque spike will be felt by vehicle occupants. In vehicles having an internal combustion engine, torque is normally reduced by retarding the spark. In diesel engines torque is reduced by reducing the quantity of fuel supplied to the engine. A step ratio transmission may be provided for a hybrid vehicle with the above configuration. However, because torque is provided from two sources to the transmission, conventional approaches to reducing torque by reducing only the engine torque are ineffective because torque may be provided by the electric machine.

This disclosure is directed to solving the above problem and other problems relating to controlling a hybrid vehicle powertrain to reduce torque during upshift operations of a step ratio transmission.

SUMMARY

According to one aspect of this disclosure, a method is disclosed for controlling a drivetrain including an engine and a motor by reducing the requested level of torque provided to the transmission during an upshift. The method is initiated by a request for a reduction of the level of torque and checking the operating state of the engine. If the engine is not on, the torque from the motor is reduced. If the engine is on, the torque from the motor is reduced first and then the torque from the engine is reduced to the requested level of torque.

According to another aspect of the disclosure as it relates to a control system for a drivetrain of a hybrid vehicle, a controller is provided that receives a signal requesting a reduction of a requested level of torque provided to a transmission during an upshift of the transmission. The controller receives a signal indicating whether an engine is on or off. If the engine is not on, the controller reduces the torque provided by a motor. If the engine is on, the controller reduces the torque provided by the motor first and then reduces the torque from the engine to the requested level.

According to a further aspect of this disclosure, a drivetrain is disclosed for a hybrid vehicle. The drivetrain comprises a motor and an engine that is selectively connectable to the engine. A step ratio transmission receives torque from the motor and torque from the engine. A controller receives a signal from the transmission requesting a temporary reduction of a requested level of torque for an upshift. In response, the controller checks the operating state of the engine. If the engine is not on, the controller reduces the torque from the motor. If the engine is on, the controller reduces the torque from the motor first and then reduces the torque from the engine to obtain the requested level of torque.

According to other aspects of this disclosure as it relates to the method, the control system, or the drivetrain, the level of torque reduction from the motor may be adjusted based on the battery state-of-charge. The level of torque reduction from the motor may be adjusted based upon an operational efficiency range of the motor. The level of torque reduction from the engine may be adjusted based upon an operational efficiency range of the engine. The torque from the motor may be calibrated to avoid operating the motor in a predetermined low speed/high torque operating region. The torque from the motor may be calibrated to be reduced if the battery state-of-charge is above a predetermined level.

As such the method, control system and drivetrain provide advantages over the prior art by reducing the torque from the engine and the motor during transmission upshift operations.

These and other aspects of the disclosure will be better understood in view of the attached drawings and the following detailed description of the illustrated embodiments.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
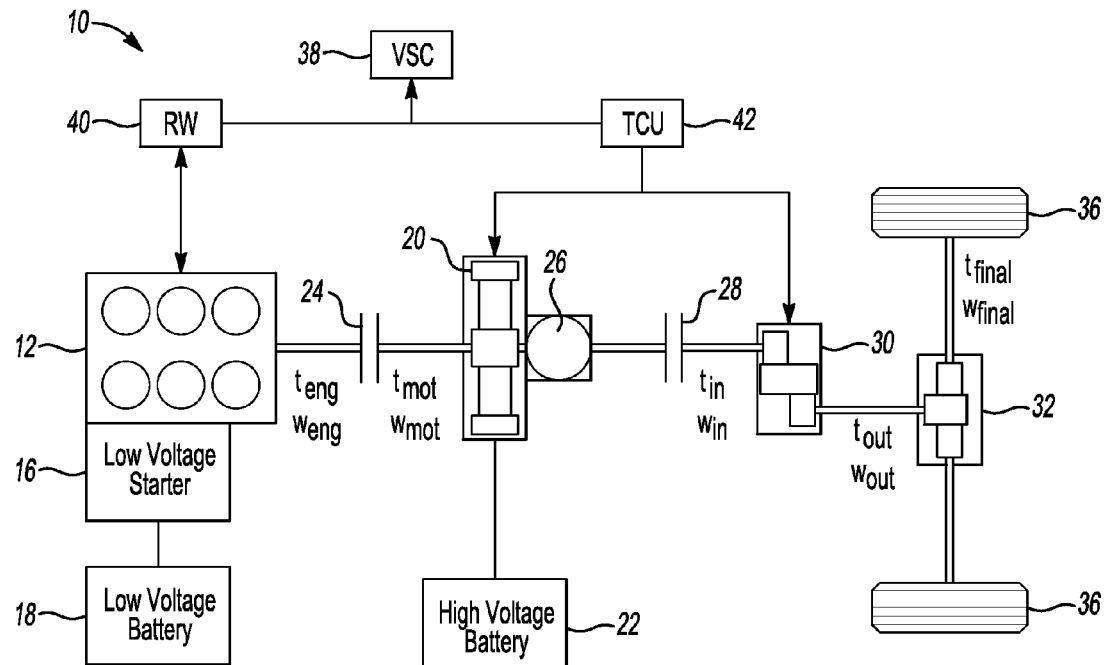
FIG. 1 is a diagrammatic view of the powertrain components of a powertrain for a hybrid electric vehicle.

Referring to FIG. 1, a powertrain 10 for a hybrid electric vehicle is illustrated diagrammatically. A combustion engine 12 is provided with a low voltage starter 16 that is powered by a low voltage battery 18. The low voltage starter 16 is used to overcome the engine compression when starting the engine 12 while the electric motor 20 is propelling the vehicle. The low voltage starter assures no torque drop out during vehicle acceleration because the motor is powered by the high voltage battery and is not used to start the engine.

An electric machine 20, or motor/generator, is electrically connected to a high voltage battery 22 that provides power to the electric machine 20 when torque is required to drive the vehicle. An engine disconnect clutch 24 is selectively operatively connected between the combustion engine 12 and the electric machine 20. The engine disconnect clutch 24 allows torque to be provided by the combustion engine 12 and the electric machine 20 in combination or separately. A transmission pump 26 is operatively connected to the powertrain upstream of a transmission launch clutch 28. The transmission launch clutch 28 provides input torque to a step ratio transmission 30. The step ratio transmission 30 provides torque to a differential 32 that, in turn, provides torque to the wheels 36 of the vehicle.

In a vehicle with a step ratio transmission 30, torque is reduced to the input of the step ratio transmission 30 while shifting to a higher gear. This may be referred to as upshift torque reduction. Upshift torque reduction reduces input torque during the shift to counter inertia torque that would otherwise cause a noticeable torque spike.

In a powertrain 10, such as that disclosed with reference to FIG. 1, the combustion engine 12 and electric motor 20 are interconnected by the engine disconnect clutch 24 to provide torque separately or jointly to the step ratio transmission 30. The method of coordinating the reduction of torque provided to the step ratio transmission 30 by the combustion engine 12 and the electric machine 20 for performing an upshift torque reduction will be explained below in greater detail.

The powertrain 10 includes a vehicle system control (VSC) for controlling various vehicle systems and subsystems and is generally represented by block 38 in FIG. 1. The VSC 38 includes a plurality of interrelated algorithms which may be distributed between a plurality of controllers within the vehicle 10. For example, the algorithms for controlling the MHT powertrain are distributed between an engine control unit (ECU) 40 and a transmission control unit (TCU) 42. The ECU 40 is electrically connected to the engine 12 for controlling the operation of the engine 12. The TCU 42 is electrically connected to the motor 20 and the transmission 30 for controlling their operation. The ECU 40 and TCU 42 communicate with each other and other controllers (not shown) over one or more wired or wireless vehicle connection using common bus protocol (e.g., CAN and LIN), according to one or more embodiments. Although the illustrated embodiment depicts the VSC 38 functionality for controlling the powertrain 10 as being contained within two controllers (ECU 40 and TCU 42) other embodiments of the powertrain 10 include a single VSC controller or more than two controllers for controlling vehicle systems.

Figure 2:
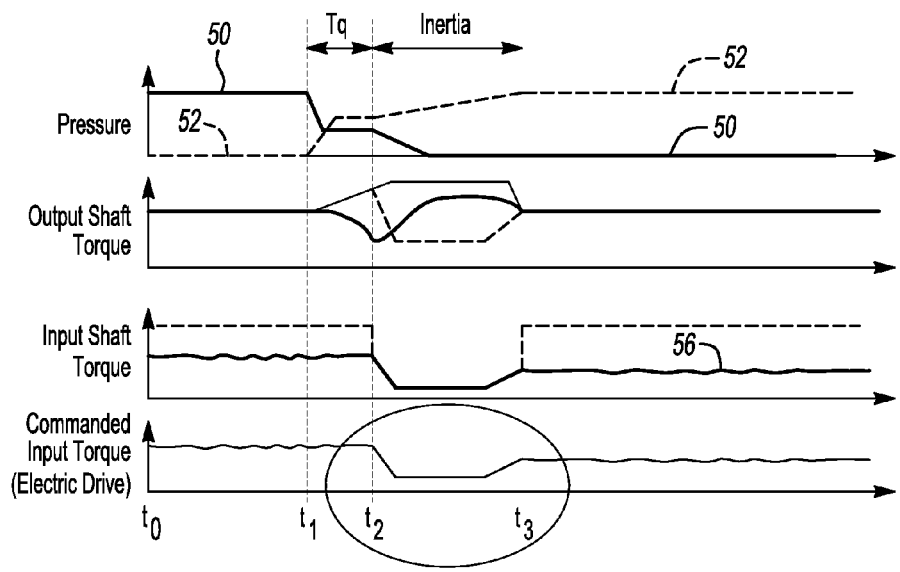
FIG. 2 is a graph showing one embodiment of an upshift torque reduction with the engine off.
Figure 3:
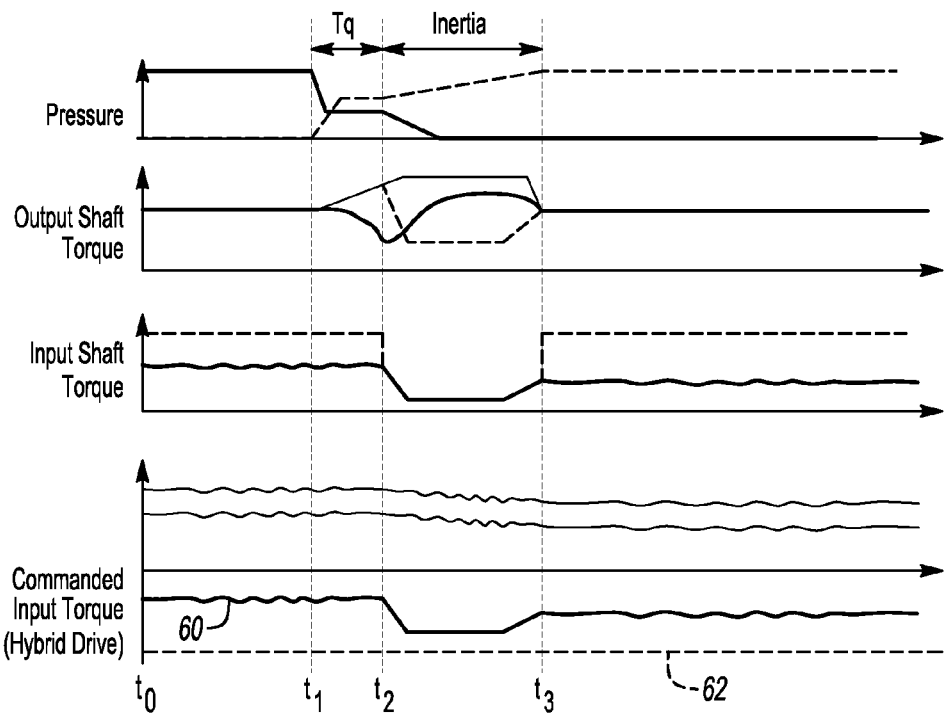
FIG. 3 is a graph showing an upshift torque reduction when both the engine and motor are active and with the electric motor charging the battery.
Figure 4:
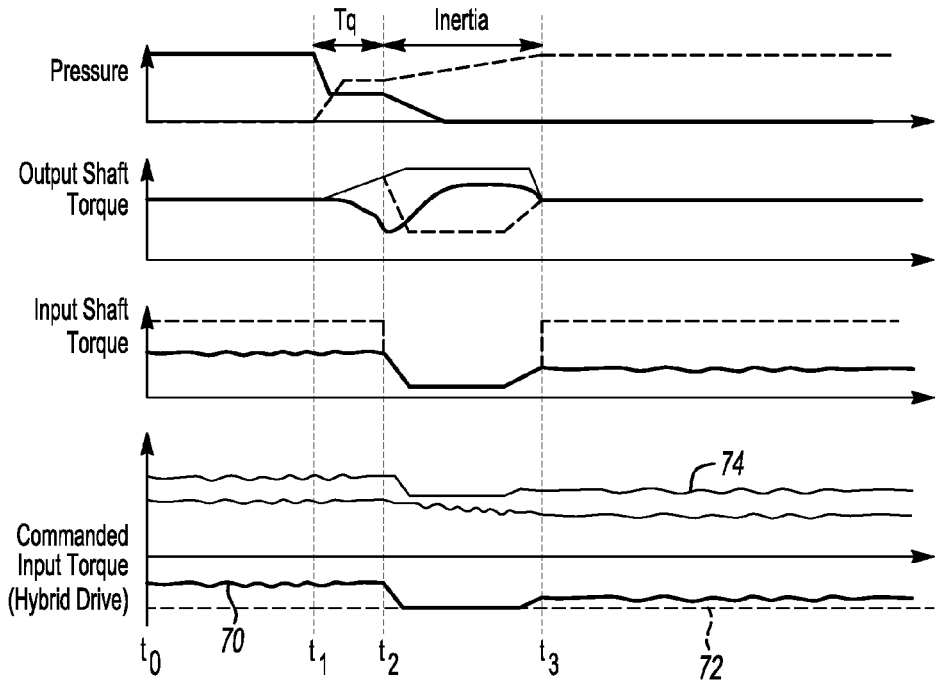
FIG. 4 is a graph showing upshift torque reduction when both the engine and motor are on with the torque reduction command being on until a motor torque reduction limit is reached.

FIGS. 2 through 4 illustrate upshift torque reduction in three illustrative powertrain operation modes. Referring to FIG. 2, an upshift torque reduction is illustrated when the engine 12 is off and torque is provided solely by the electric motor 20. At time $T_1$, the beginning of an upshift event is indicated. At this phase, the off-going clutch pressure is reduced as shown by line 50 while the oncoming clutch pressure at 52 is increased. Inertia torque is released as the gear ratio changes from the lower gear to the higher gear. $T_2$ marks the beginning of the inertia phase. The torque reduction command from the TCU 42 (or VSC 38) is inactive before time $T_2$. At time $T_2$, the transmission control activates the torque reduction command and requests a torque reduction value to counter the inertia torque. The torque reduction command ramps down to a low level and is held until the end of the inertia phase. At time $T_3$, the torque reduction command is inactivated and the input shaft torque on line 56 is restored to the level desired in the new gear. In this mode, the entire torque reduction command must be honored by the motor because the electric machine is the only source of torque in the example illustrated by FIG. 2.

Referring to FIG. 3, upshift torque reduction is illustrated with the combustion engine 12 on. The electric motor 20 may be used, as needed, for charging the battery 22 while the engine 12 is on. In FIG. 3, the commanded motor torque is negative indicating that torque is being drawn from the powertrain and used to charge the battery. The upshift event begins at time $T_1$ and ends at time $T_3$, as previously described with reference to FIG. 2. In FIG. 3, both the engine and motor are active and may be used to honor a torque reduction command from the transmission. The bottom line 62 of FIG. 3 shows a motor torque reduction limit. The motor torque reduction limit 60 may be more negative than the desired motor torque during the upshift torque reduction. The entire torque reduction command can be honored with the motor 20 only because a reduction of the motor torque desired is less negative than the motor torque reduction limit.

Referring to FIG. 4, the upshift torque reduction is illustrated with the combustion engine 12 on. The electric machine 20 may be used for charging the battery while the engine is on. Charging the battery is shown as the commanded motor torque. The commanded motor torque is negative to indicate that torque is being drawn from the powertrain for charging the battery 22. The shift event beginning at time $T_1$ and ending at time $T_3$ is as described with reference to FIG. 2 above. In this mode, both the engine and motor are active. However, the motor reduction limit 72 shown as the bottom line of FIG. 4 is less negative than the desired motor torque during the upshift torque reduction. In this case, the motor torque reduction command cannot be honored by the motor 20 alone due to the motor torque reduction limit. As a result, a portion of the requested torque reduction must be honored by reducing the torque provided by the combustion engine 12 as shown by line 74.

Figure 5:
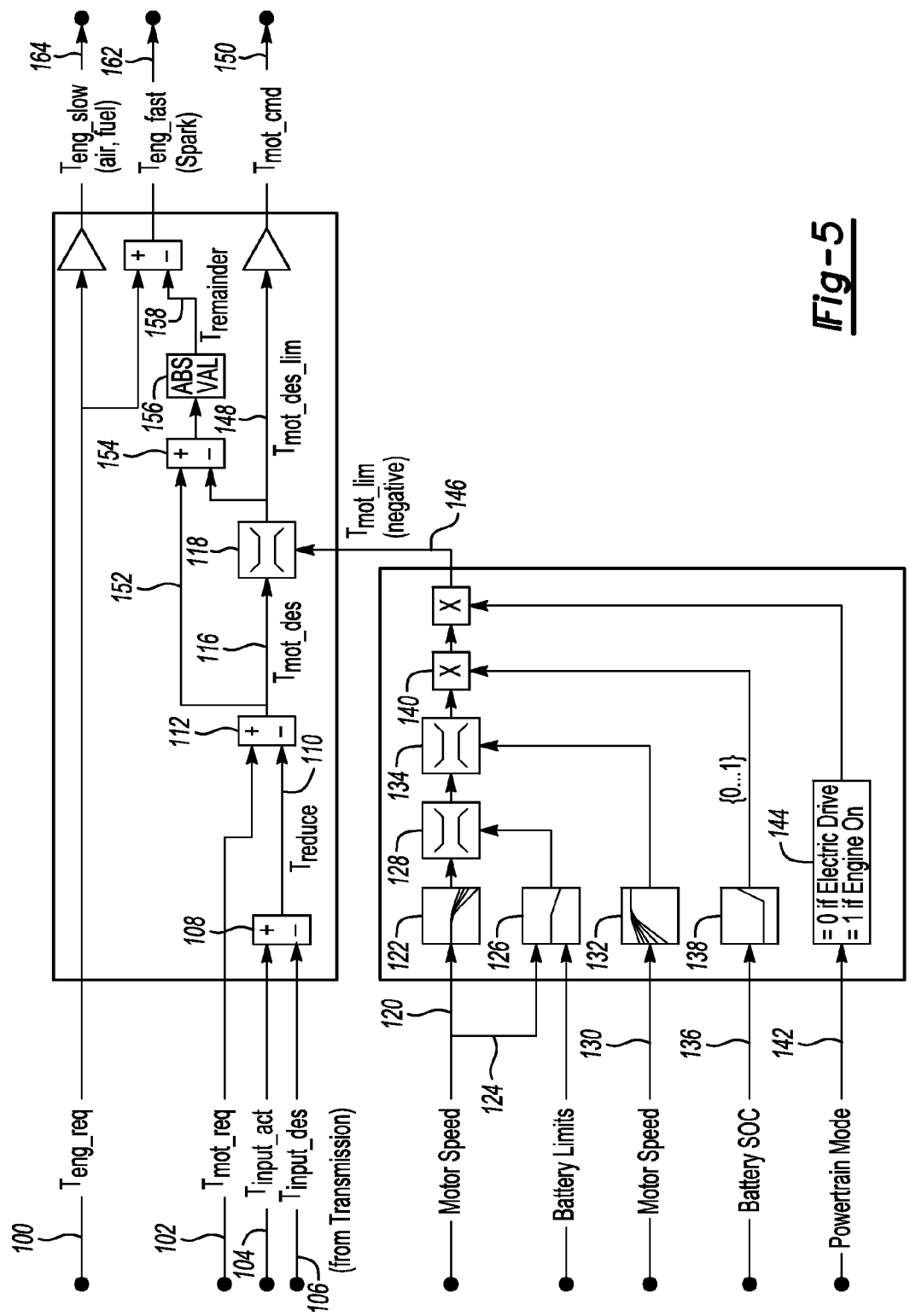
FIG. 5 is a block diagram of the upshift torque reduction algorithm.

Referring to FIG. 5, an algorithm is illustrated for calculating the torque split between the combustion engine 12 and the motor 20. The algorithm also calculates the motor torque reduction limit. The algorithm is contained within the TCU 42 according to one or more embodiments, and may be implemented in hardware and/or software control logic as described in greater detail herein.

The TCU 42 receives inputs corresponding to an engine torque request ($T_{eng\_req}$) and a motor torque request ($T_{mot\_req}$). The actual torque on the transmission input shaft ($T_{input\_act}$) is calculated based on these inputs according to the following equation:

$$T_{input\_act} = T_{mot\_req} + T_{eng\_req}$$

According to the above equation, the transmission input shaft torque is equal to the electric motor torque request and the engine torque request. During an upshift, the transmission control requests a desired input torque ($T_{input\_des}$) for the shift event that is shown as the torque reduction command in FIGS. 2-4. The level of torque reduction ($T_{reduce}$) is calculated according to the following equation: ($T_{reduce} = T_{input\_act} - T_{input\_des}$). The desired motor torque with torque reduction may be calculated ($T_{mot\_des} = T_{mot\_req} - T_{reduce}$). A motor torque reduction limit $T_{mot\_lim}$ sets a lower boundary on the desired motor torque $T_{mot\_des}$. This limited motor torque ($T_{mot\_des\_lim}$) is sent directly to the motor as the commanded motor torque $T_{mot\_cmd}$.

The torque reduction during upshift is limited by $T_{mot\_lim}$. The amount of torque reduction that cannot be achieved by the motor alone is calculated as $T_{remainder} = ABS(T_{mot\_des} - T_{mot\_des\_lim})$. As a result, any additional torque reduction to satisfy $T_{input\_des}$ must be provided by the engine. The fast engine torque command $T_{eng\_fast}$ is reduced in order to make up the difference ($T_{eng\_fast}=T_{eng\_req}-T_{remainder}$).

Referring to FIG. 5, lines 100-106 represent input that is provided to the TCU 42 (or VSC 38). Line 100 represents requested engine torque ($T_{eng\_req}$) before the transmission signals a request for torque reduction. Line 102 represents the requested motor torque ($T_{mot\_req}$) before initiating the torque reduction algorithm. Line 104 represents the torque on the transmission input shaft ($T_{input\_act}$). Line 106 represents the torque reduction command or desired input torque ($T_{input\_des}$). during the shift event. The torque reduction command is invalid when the transmission is not in the process of shifting. A determination is made as the amount of torque that must be removed from the input shaft during the shift ($T_{reduce}$) is determined at junction 108 as the difference between the torque on the transmission input shaft ($T_{input\_act}$) and the desired input torque 106, ($T_{reduce}=T_{input\_act}-T_{input\_des}$). $T_{reduce}$ is represented by line 110. The difference between the amount of torque reduction and the requested motor torque is determined at 112 in the torque reduction algorithm. The desired motor torque on line 116 ($T_{mot\_des}$) is compared to the difference between the output of a torque min/max limiter that is limited by the lower limit of motor torque ($T_{mot\_lim}$) during the shift as derived by the torque reduction algorithm.

The lower limit on motor torque is developed based upon the mechanical limit, electrical limit, efficiency calibration, state-of-charge calibration and the powertrain mode indication. These five elements are used to calculate the motor torque reduction limit ($T_{mot\_lim}$). The motor speed is supplied on line 120 to the mechanical limit 122 and on line 124 to the electrical limit 126. The mechanical limit is the motor mechanical torque limit based upon motor speed and mechanical losses. The electrical limit is the system electrical torque limit that is based upon battery power limits and system electrical losses. The battery limits are also provided to the electrical limit to restrict the mechanical limit by the limiter 128. Motor speed is also provided on line 130 to an efficiency calibration at 132. The efficiency calibration is a calibration that defines the lowest desired motor torque that may be used at an operating motor speed. The efficiency calibration is provided to a limiter 134 to prevent the motor from operating at undesirable operating points. A battery state-of-charge signal is provided on line 136 to state-of-charge calibration at 138. If the battery state-of-charge is high, then it may be undesirable to use the motor to reduce torque. The battery state-of-charge calculation produces a multiplier that acts on $T_{mot\_lim}$. At a low state-of-charge, the multiplier is close to or equal to one causes $T_{mot\_lim}$ to have a large negative value at 140. At a high state-of-charge, the multiplier is close to or equal to zero thereby resulting in $T_{mot\_lim}$ being close or equal to zero at 140. A powertrain mode signal is also provided on line 142 to the motor torque reduction limit algorithm. When the powertrain is in the electric drive mode, $T_{mot\_lim}$ is forced to zero at 144 to prevent making the net input shaft torque less than zero during the torque reduction. When the engine is on, the engine torque will be positive so $T_{mot\_lim}$ will be unaffected at 144.

$T_{mot\_lim}$ at 146 is used to limit $T_{mot\_des}$ at 118 and provides $T_{mot\_des\_lim}$ on line 148 that is used to generate a torque motor command $T_{mot\_cmd}$ at 150 to command the motor to provide a reduced level of torque. The difference between the torque motor desired $T_{mot\_des}$ value on line 152 and the limited torque motor desired is determined at 154 and is then limited to its absolute value at 156 to provide a value of the torque remaining $T_{remainder}$ on line 158. $T_{remainder}$ is subtracted from the engine requested torque ($T_{eng\_req}$) from line 100 to provide a signal to the engine ($T_{ens\_fast}$) at 162. $T_{eng\_fast}$ is normally the same as $T_{eng\_slow}$ at 164, but overrides $T_{eng\_slow}$ when there is a difference between the two values.

Figure 6:
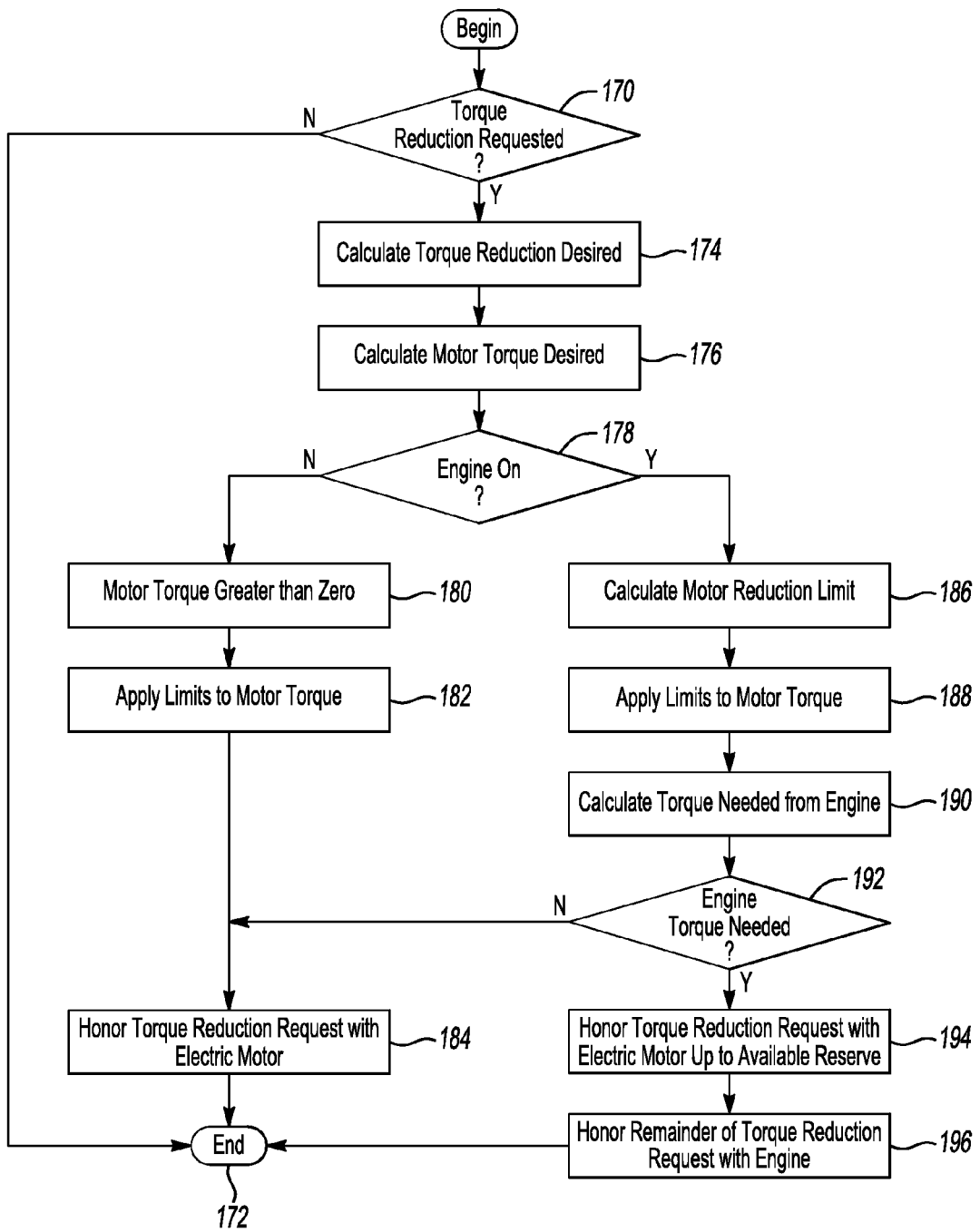
FIG. 6 is a flowchart of the upshift torque reduction algorithm.

Referring to FIG. 6, a simplified upshift torque reduction algorithm is presented in the form of a flowchart. The process begins with a determination at 170 as to whether a torque reduction is requested by the transmission. If not, the algorithm ends at 172. If torque reduction is requested by the transmission, torque reduction desired is calculated ($T_{reduce}=T_{input\_act}-T_{input\_des}$) at 174. The motor torque desired is then calculated ($T_{mot\_des}=T_{mot\_req}-T_{reduce}$) at 176. Next, a determination at 178 is made as to whether or not the engine is on in the current operating mode. If the engine is not on, it is determined at 180 whether the motor torque is greater than zero ($T_{mot\_lim}=0$). Limits are then applied at 182 to the motor torque ($T_{mot\_des\_lim}=T_{mot\_des}$ where ($T_{mot\_des}>0$). The torque reduction request is then honored at 184 by reducing the torque provided by the electric motor ($T_{mot\_cmd}=T_{mot\_des\_lim}$). If the engine is on at 178, the motor reduction limit is calculated at 186 ($T_{mot\_lim}=f(SOC)$, $P_{bat\_lim}$, $T_{mech}$, $T_{elec}$). Limits to the motor torque are applied at 188 ($T_{mot\_des\_lim}=T_{mot\_des}$ where ($T_{mot\_lim}<T_{mot\_des}<0$). The torque needed from the engine is then calculated at 190 ($T_{remainder}=ABS(T_{mot\_des}-T_{mot\_des\_lim})$. A determination is then made at 192 as to whether engine torque is needed ($T_{remainder}>0$). The algorithm then proceeds at 194 to honor the torque reduction request with the electric motor up to the available reserve ($T_{mot\_cmd}=T_{mot\_des\_lim}$). The engine at 196 honors the remainder of the torque reduction request with the engine ($T_{eng\_fast}=T_{eng\_req}-T_{remainder}$).

As such the method, control system and drivetrain provide advantages over the prior art by controlling the torque from the engine and the motor that is provided to the step-ratio transmission depending upon the operating state of the engine and motor and limiting factors such as the battery state of charge, engine efficiency, motor efficiency, and other potentially limiting factors.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A method of controlling a drivetrain including an engine and a motor by reducing torque when requested during an upshift comprising:
   reducing motor torque; and
   then reducing engine torque to a threshold torque level when the engine is on.

2. The method of claim 1 further comprising adjusting torque from the motor based on a state-of-charge of a battery.

3. The method of claim 1 further comprising adjusting torque from the motor based upon an operational efficiency range of the motor.

4. The method of claim 1 further comprising adjusting torque from the engine based upon an operational efficiency range of the engine.

5. The method of claim 1 further comprising calibrating reducing the torque from the motor to avoid operating the motor at a predetermined low speed/high torque operating region.

6. The method of claim 1 further comprising calibrating reducing the torque from the motor if a state-of-charge of a battery is above a predetermined level.

7. A control system for a drivetrain of a vehicle that reduces torque when requested comprising:
a controller configured to:
receive a signal indicating whether an engine is on or off;
reduce motor torque; and
then reduce engine torque to a requested level if the engine is on.

8. The control system of claim 7 further comprising adjusting torque from the motor based on a state-of-charge of a battery.

9. The control system of claim 7 further comprising adjusting torque from the motor based upon an operational efficiency range of the motor.

10. The control system of claim 7 further comprising adjusting torque from the engine based upon an operational efficiency range of the engine.

11. The control system of claim 7 further comprising calibrating reducing torque from the motor to avoid operating the motor at a predetermined low speed/high torque operating region.

12. The control system of claim 7 further comprising calibrating reducing the torque from the motor if a state-of-charge of a battery is above a predetermined level.

13. A drivetrain for a hybrid vehicle comprising:
a motor;
an engine selectively connectable to the engine;
a step ratio transmission that receives motor torque from the motor and engine torque from the engine; and
a controller configured to reduce torque when requested:
reduce the motor torque, and
then reduce the engine torque to obtain a requested level of torque.

14. The drivetrain of claim 13 further comprising adjusting torque from the motor based on a state-of-charge of a battery.

15. The drivetrain of claim 13 further comprising adjusting torque from the motor based upon an operational efficiency range of the motor.

16. The drivetrain of claim 13 further comprising adjusting torque from the engine based upon an operational efficiency range of the engine.

17. The drivetrain of claim 13 further comprising calibrating reducing torque from the motor to avoid operating the motor at a predetermined low speed/high torque operating region.

18. The drivetrain of claim 13 further comprising calibrating reducing the torque from the motor if a state-of-charge of a battery is above a predetermined level.

* * * * *